United States Patent
Quintero-Marquez et al.

(10) Patent No.: US 12,529,002 B2
(45) Date of Patent: Jan. 20, 2026

(54) METHOD FOR PRODUCING COMBUSTIBLE PELLETS BY IMPROVED STEAM CRACKING USING HETEROGENEOUS BIOMASS

(71) Applicant: Europeenne De Biomasse, Paris (FR)

(72) Inventors: Adriana Quintero-Marquez, Le Vesinet (FR); Jean-Luc Despres, Verzenay (FR); Frédéric Martel, Riems (FR)

(73) Assignee: Europeenne De Biomasse, Paris (FR)

( * ) Notice: Subject to any disclaimer, the term of this patent is extended or adjusted under 35 U.S.C. 154(b) by 0 days.

(21) Appl. No.: 17/996,151

(22) PCT Filed: Apr. 16, 2021

(86) PCT No.: PCT/FR2021/050672
§ 371 (c)(1),
(2) Date: Oct. 13, 2022

(87) PCT Pub. No.: WO2021/209725
PCT Pub. Date: Oct. 21, 2021

(65) Prior Publication Data
US 2023/0193149 A1    Jun. 22, 2023

(30) Foreign Application Priority Data
Apr. 17, 2020 (FR) ...................................... 2003905

(51) Int. Cl.
*C10L 5/14* (2006.01)
*C10B 53/02* (2006.01)
*C10L 5/36* (2006.01)

(52) U.S. Cl.
CPC .............. *C10L 5/143* (2013.01); *C10B 53/02* (2013.01); *C10L 5/363* (2013.01); *C10L 2290/148* (2013.01)

(58) Field of Classification Search
CPC ..... C10B 49/02; C10B 53/02; C10L 2250/06; C10L 2290/148; C10L 5/143; C10L 5/363; C10L 5/442; C10L 9/083; C10L 9/086
See application file for complete search history.

(56) References Cited

U.S. PATENT DOCUMENTS

| | | | |
|---|---|---|---|
| 2013/0248760 A1* | 9/2013 | Ampulski | D21B 1/36 252/183.11 |
| 2016/0333519 A1* | 11/2016 | Radigan | C12P 7/10 |
| 2017/0298150 A1 | 10/2017 | Bonde | |
| 2019/0203134 A1* | 7/2019 | Joronen | C10L 9/12 |

FOREIGN PATENT DOCUMENTS

| | | | | |
|---|---|---|---|---|
| CN | 104519991 A | 4/2015 | | |
| CN | 108368443 A | 8/2018 | | |
| CN | 110408450 A | 11/2019 | | |
| FR | 2955118 B1 | 5/2012 | | |
| FR | 3095656 A1 * | 11/2020 | ............ | C10B 49/02 |
| WO | 2013/191897 | 12/2013 | | |
| WO | 2019/054913 A1 | 3/2019 | | |
| WO | 2020/225504 | 11/2020 | | |

OTHER PUBLICATIONS

International Search Report for International Application No. PCT/FR2021/050672 dated Jul. 14, 2021, 5 pages.
International Written Opinion for International Application No. PCT/FR2021/050672 dated Jul. 14, 2021, 5 pages.
Chinese Office Action and Search Report for Application No. 202180022992.6 dated Oct. 26, 2025, 11 pages with machine translation.

* cited by examiner

Primary Examiner — Latosha Hines
(74) Attorney, Agent, or Firm — TraskBritt

(57) ABSTRACT

The production of steam-cracked biomass in the form of black pellets in the field of solid biofuels. More particularly, the present disclosure relates to the production of black pellets from a heterogeneous biomass. The aim of the present disclosure is to produce black pellets having good mechanical strength, good water resistance and an increased calorific value.

4 Claims, No Drawings

METHOD FOR PRODUCING COMBUSTIBLE PELLETS BY IMPROVED STEAM CRACKING USING HETEROGENEOUS BIOMASS

CROSS-REFERENCE TO RELATED APPLICATIONS

This application is a national phase entry under 35 U.S.C. § 371 of International Patent Application PCT/FR2021/050672, filed Apr. 16, 2021, designating the United States of America and published as International Patent Publication WO 2021/209725 A1 on Oct. 21, 2021, which claims the benefit under Article 8 of the Patent Cooperation Treaty to French Patent Application Serial No. FR2003905, filed Apr. 17, 2020.

TECHNICAL FIELD

The present disclosure relates to the production of steam-cracked biomass in the form of black pellets in the field of solid biofuels. More particularly, it relates to the production of black pellets from a heterogeneous biomass. The aim of the present disclosure is to produce black pellets with good mechanical strength, good water resistance and an increased calorific value.

BACKGROUND

The production of renewable energy (electrical and thermal) can be done from the environment (sun, wind, tide, swell, geothermal, hydraulic) or from biomass. River or dam hydraulics and geothermal energy are currently intermittent renewable energies, and will remain so as long as energy storage means are not developed. Only biomass constitutes a primary energy that can be transported to its place of transformation into heat and/or electricity. But biomass is actually a sparse, variable and perishable energy.

There are several ways to densify and stabilize lignocellulosic biomass, including carbonization, roasting and steam cracking. The first, which makes it possible to manufacture charcoal, involves a high price of the material due to a significant loss of yield (on the order of 70 to 80%), and is reserved for uses at a high "sale price," such as household use in a barbecue. Roasting is a technology with an acceptable yield (10% to 20% loss), but the price remains prohibitive and the technology is not mature. To date, only steam cracking seems technically and economically viable, provided production costs are contained. This technology makes it possible to manufacture "black pellets."

It should be noted that steam cracking cannot be likened to hydrothermal pretreatment or pyrolysis techniques.

Hydrothermal pretreatment, also called aqueous fractionation, solvolysis, hydrothermolysis or hydrothermal treatment, involves the use of water at high temperature and high pressure to promote the disintegration and separation of the lignocellulosic matrix. This technique is not suitable for producing black pellets, since the products obtained are mainly liquid. Pyrolysis is the chemical decomposition of an organic compound by intense heating in the absence of oxygen. The compounds obtained after pyrolysis differ in their characteristics from those obtained by steam cracking. Steam cracking cannot be likened to a pyrolysis technique in that it uses a steam explosion and is done in the presence of oxygen.

The transformation of lignocellulosic biomass (wood, agricultural residues, agriculture and agro-industry co-products) into an energy-dense, transportable and easily storable compound makes it possible to develop and consolidate an industrial sector of stationary energy (biofuel used at a fixed point, the home, unlike biofuels) and to reduce environmental impacts (fossil $CO_2$ emissions, with biomass without fertilizers or phytosanitary products). The thermal treatment of the biomass by steam cracking allows this densification of the energy, by homogenizing the biomass into a steam-cracked powder according to precise parametric conditions, in particular, of particle size, temperature and residence time. The powder is then granulated to facilitate its transport, storage and use.

It is important to ensure that the granulation method is able to ensure a constant and quality product, with a high calorific value and suitable mechanical behavior to be stored, transported and used in boilers, with the best characteristics of mechanical and water resistance, reduction in the formation of (fine) dust during handling, dryness to ensure good calorific value and good combustion, and stability over time and storage (no self-heating fermentation, gas release, etc.).

Granulation by passing the steam-cracked powder through a pellet press makes it possible to form dense and resistant pellets. Conventionally on the white pellet, the refined and compressed softwood sawdust (75% between 0.36 and 1 mm, and 50% less than 0.5 mm) produces pellets between 6, 8 and 10 mm in diameter, 2 to 5 cm in length, with a bulk density of 600 to 650 g/L, with a mechanical strength (durability) of 97.5% and a PCI/gross of 4.9 kWh/kg for less than 8% humidity (between 5 and 8% usually). However, it has no water resistance (it completely disintegrates in water in less than 5 minutes). The hardwood black pellet has a bulk density of 650-750 g/L, with a mechanical strength (durability) of 98.5% and a PCI/gross >5.0 kWh/kg at less than 10% humidity (usually equal or very close to 10%). It has an immersion resistance that allows it to reversibly capture less than 10% of its weight in water without a noticeable change in its durability after drying.

However, when a steam-cracked powder is pelletized in which the fibers are too short, this leads to poorer durability, the presence of scales on the pellet, a lower apparent density, and more fines produced, especially during handling.

If the severity conditions can be adapted to modulate the steam cracking in order to improve the pelletizing of the black pellets, they make it possible to manufacture longer fibers, but to the detriment of the increase in the expected calorific value and other properties such as water resistance or mechanical strength, the drop in cohesion due to lignin, which migrates less at lower severity. This approach is therefore not satisfactory on its own.

There is therefore a need to control the pelletizing method by new means to improve the quality of the pelletizing of the black pellets.

Patent WO2013/191897 describes a plant and a method dedicated to the treatment of biomass using steam explosion methods as pretreatment before gasification or combustion. Moisture values of incoming biomass left outside without further drying are between 15% to 60%. The method uses a steam explosion step in which: biomass is introduced into a steam explosion unit, low-pressure steam is introduced and then steam at least at 10 times atmospheric pressure is finally introduced to heat and pressurize the biomass before rapid depressurization. The produced fine wet biomass particles are then fed to a feed section of the biomass gasifier, which reacts with the biomass particles in a rapid biomass gasification reaction to produce syngas components. The product obtained by this method is a synthesis gas.

Patent WO2019/054913A1 relates to a method for producing wood pulp allowing the production of fuel pellets or briquettes from wood. The method involves debarking tree logs, which are then reduced to wood chips. A part of these chips is used to form a paste, while another undergoes a steam cracking step. The heat-treated bark is discharged from the reactor through an adjustable blow-off valve or constant-diameter discharge orifice to effect steam explosion discharge of the bark. After the steam explosion step, the chips obtained are granulated with the lignin recovered during the wood pulp production step.

Patent WO2020/225504 relates to a pulverulent carbonaceous substrate for chemical or biochemical reaction obtained by continuous steam cracking of a lignocellulosic biomass at a humidity level of between 5% and 27% without chemical auxiliary by applying a severity factor between 3 and 5. The carbonaceous substrate may be in the form of a slightly densified pellet. This form can be adopted when packaging the product in order to facilitate its handling, but its characteristics are those of a powder when the substrate is impregnated with a solution (enzymatic, acid, etc.).

BRIEF SUMMARY

It has been shown, unexpectedly, that the quality of the black pellets is improved when the latter are produced from a steam-cracked biomass of heterogeneous particle size.

More generally, they have shown that good pelletizing could be obtained by mixing steam cracked powders from different biomasses. For example, powders from soft hardwoods such as poplar, or certain hardwoods such as ash, deliver very fibrous powders that can advantageously be mixed with an oak powder that comprises about 80% fines.

In addition, they demonstrated that the steam-cracked powder from coarsely ground biomass (around an average size of 30 mm to 40 mm instead of 10 to 20 mm) made it possible to obtain a powder with a more satisfactory calorific value (PCI) owing to the presence of residual fibers in sufficient quantity (about 20%) capable of agglomerating and ensuring good pelletizing with the powder and the fine cottony fibers co-existing so as to obtain a black pellet with the required specifications.

On the basis of these observations, it has been established that to obtain a quality black pellet, it is important to use a heterogeneous steam-cracked biomass having both fibers (on the order of 20% greater than 1 mm), but also fines in the form of powders or very fine cottony fibers (less than 0.5 mm).

Thus, the present disclosure relates to a method for producing combustible black pellets by continuous steam cracking of biomass at a humidity level of between 5 and 27%, characterized in that the pelletizing step is carried out on an unwashed steam-cracked biomass comprising on the one hand at least 50% of pulverulent compounds with a section of less than 0.5 millimeters and on the other hand at least 10% of fibrous compounds having a length greater than 1 millimeter, the pulverulent and fibrous compounds being bound by the hemicellulose and lignin present in the biomass, without additives.

Advantages of the Present Disclosure

The method according to the present disclosure has the advantage of ensuring the production of black pellets of good quality in a constant manner: good mechanical strength, good water resistance as well as an increased calorific value.

In addition, using a heterogeneous steam-cracked biomass makes it possible to produce quality pellets without adding any additive, in which the steam-cracked lignin serves as a binder. Additives are expensive and generally undesirable due to their toxicity; eliminating them is therefore advantageous from an economic and ecological point of view.

The heterogeneity of the powders can be obtained in different ways:
- by using an input biomass whose grinding leads to particles of the platelet type of heterogeneous size,
- by using an input heterogeneous biomass consisting of a mixture of different plant species,
- by modulating the severity conditions during steam cracking,
- by mixing biomasses obtained from the same input biomass but treated under different severity conditions during steam cracking,
- by mixing different steam-cracked biomasses obtained from different plant species.

A method is thus proposed allowing better management of the biomass: the size of the powder particles can be measured after steam cracking to prepare a suitable heterogeneous mixture with a view to quality pelletizing.

DETAILED DESCRIPTION

The present disclosure relates to a method for producing combustible pellets by continuous steam cracking of biomass at a humidity level of between 5 and 27%, characterized in that the pelletizing step is carried out on a steam-cracked biomass comprising on the one hand at least 50% of pulverulent compounds with a section of less than 0.5 millimeters, and on the other hand at least 10% of fibrous compounds having a length greater than 1 millimeter, without additives.

In this method, additives are not necessary because the powdery and fibrous compounds of the wood, in particular, lignin and hemicellulose, are bound in the pellets following the chemical and physical modifications induced by the steam cracking.

Within the meaning of the present disclosure, "additives" means the commercial compounds introduced between 0.5% and 10% by weight, such as certain compounds of starch, flour, or other plant or petrochemical substances providing a binder.

Within the meaning of the present disclosure, "biomass" means the lignocellulosic biomass originating both from agricultural and forestry residues, from wood transformation by-products and from dedicated crops. It may, in particular, be wood chips, with or without bark. The quality of this raw material will directly influence the quality and energy characteristics of the solid combustible material. For example, the most used woods are hardwoods and softwoods.

In a preferred embodiment, the humidity level is between 7% and 20%, and even more preferably is between 8 and 14%.

In another preferred embodiment, the pulverulent compounds with a section of less than 0.5 millimeters represent at least 75% of the steam-cracked biomass.

In another preferred embodiment, the fibrous compounds having a length greater than 1 millimeter represent at least 20% of the steam-cracked biomass.

The biomass also comprises powdery compounds and fibrous compounds, cottony compounds.

In a particular embodiment of the present disclosure, the steam-cracked biomass is heterogeneous because it comes from different plant species.

The composition of the lignocellulosic biomass varies according to the plant species in these major constituents, i.e., cellulose, hemicellulose and lignin. This is why the powders obtained by steam cracking from the different species are not of equivalent quality.

In a preferred embodiment, the steam cracking of the different plant species is carried out in a single step.

In another particular embodiment, the steam-cracked biomass is heterogeneous in that it comes from several steam cracking operations of the same initial biomass under different severity conditions, the powders obtained being mixed before pelletizing.

The different steam cracking operations of the same initial biomass under different severity conditions can be carried out at different times or in parallel. In a preferred embodiment, they are carried out simultaneously in continuous reactors arranged in parallel.

To implement the method according to the present disclosure, the particle size of the steam-cracked biomass powders must be known. To do this, the particle size of these powders can be measured before pelletizing. This measurement can be done by any means known to those skilled in the art, and preferably by means that can be integrated into the production line, such as measurement by optical scattering (laser), or even measurement by sieve systems. The result of this analysis allows, if necessary, an external powder supply so as to respect the size proportions recommended for quality pelletizing.

Thus, in a particular embodiment, the method comprises a step in which the particle size of the steam-cracked biomass is analyzed before pelletizing.

The density of the steam-cracked powder is also an indicator of its heterogeneity and therefore of its pelletability.

In a particular embodiment, the method further comprises a step of adding lignin originating from a steam-cracked biomass before pelletizing.

The method can also comprise a step in which the various powders constituting the heterogeneous biomass are pre-pelletized separately and then mixed before pelletizing. Pre-pelletizing the powders facilitates their handling and transport.

The particle size of the biomass after steam cracking is also influenced by the particle size of the biomass before steam cracking, that is to say, by the size of the platelets or other form of the initial biomass. This parameter can be easily modulated by adapting the grinding grids.

Thus, the method can comprise a step in which the particle size of the ground biomass before steam cracking is heterogeneous.

The present disclosure finds its application with industrialists who seek to optimize the production of biofuels by standardizing the final product according to a variable supply, which becomes desirable instead of being endured; the interest is also to be able to arbitrate owing to a mixture to the variations of availability and price of the biomasses, in the interest of the final pelletized product.

The invention claimed is:

1. A method for producing combustible black pellets, comprising:
   steam cracking a heterogenous biomass comprising different plant species to form a steam-cracked biomass composition,
      wherein at least 50% by weight based on a total weight of the steam-cracked biomass composition having a size of less than 0.5 millimeters, and at least 10% by weight based on the total weight of the steam-cracked biomass composition having a size of greater than 1 millimeter; and
   pelletizing a steam-cracked biomass composition to form the pellets.

2. The method of claim 1, wherein the steam cracking the heterogenous biomass comprising the different plant species is performed in a single steam cracking operation.

3. The method of claim 1, further comprising analyzing the size of the steam-cracked biomass composition before the pelletizing of the steam-cracked biomass composition.

4. The method of claim 1, further comprising adding a steam-cracked lignin to the steam-cracked biomass composition before the pelletizing of the steam-cracked biomass composition.

* * * * *